Sept. 30, 1969

G. J. WATT 3,469,475

APPARATUS FOR MAINTAINING POSITIONAL STABILITY
BETWEEN A TOOL MEMBER AND A WORKPIECE

Filed April 14, 1967

INVENTOR.
GORDON J. WATT
BY
ATTORNEY

INVENTOR.
GORDON J. WATT
BY
ATTORNEY

United States Patent Office 3,469,475
Patented Sept. 30, 1969

3,469,475
APPARATUS FOR MAINTAINING POSITIONAL STABILITY BETWEEN A TOOL MEMBER AND A WORKPIECE
Gordon J. Watt, Hopkins, Minn., assignor to Sperry Canada Limited, Toronto, Ontario, Canada
Filed Apr. 14, 1967, Ser. No. 631,034
Claims priority, application Canada, Feb. 27, 1967, 983,916
Int. Cl. F16h 5/40, 25/12, 25/18
U.S. Cl. 77—4         7 Claims

ABSTRACT OF THE DISCLOSURE

A material removal control apparatus for use in a machine tool system to provide dynamic positional stability of a work contacting member relative to a workpiece so that machining operations may be performed to tolerances on the order of microinches, the positional stability being provided by an actuator mechanism responsive to a signal from a transducer which is sensitive to relative motion between the workpiece and work contacting member.

---

The invention herein described was made in the course of or under a contract or subcontract thereunder with the Department of the Air Force.

Background of the invention

The present invention relates to machine tools and more particularly to means for improving the positional stability between the tool and work to provide a capability for machining to tolerances on the order of microinches. The invention also relates to a novel tool assembly for achieving the required positional stability of the tool.

In a machine tool apparatus, positional stability must be maintained between the work and cutting tool to assure that the prescribed amount of material is removed during the machining process. The positional stability is disturbed, however, by various factors such as nonhomogeneity of the work and vibration of the tool relative to the work. Even in the absence of these disturbances the amount of material removed is likely to be in error because of forces interacting between the work and a work contacting tool member. In certain machining operations such as turning and boring for example, the work exerts a force against the cutting edge of the tool which tends to bend the tool shank and thereby reduce the depth of cut. For a turning process, the positional stability between the tool and work may be improved somewhat by using a tool with a short, thick shank. In a boring process performed with a single point cutting tool, though, the length and thickness of the shank are dependent on the depth and diameter of the hole that is to be bored. As a result, deep holes with small diameters are particularly difficult to bore with precision because to tool shank must be long and narrow, thus making it extremely sensitive to vibration and bending forces.

Summary of the invention

The present invention compensates for the aforementioned and other limitations of the prior art by means of a tool assembly comprising a tool member, an actuator mechanism and a strain transducer which furnishes an error signal indicative of motion of the work contacting part of the tool member, the error signal being fed through appropriate amplification and compensation networks to the actuator mechanism which responds thereto so as to compensate for motion of the work contacting part.

A principal object of the present invention is to provide, in a machine tool apparatus, means for improving the dynamic positional stability of a work contacting tool member relative to the work.

Another object is to provide a machine tool apparatus capable of performing machining operations to tolerances on the order of microinches.

Another object is to provide means for compensating a machine tool for flexing and vibration of a tool shank so that the work contacting member of the tool is laterally stabilized at a fixed displacement from a reference line collinear with the longitudinal axis of the tool shank in its unflexed state.

Another object is to provide, in a machine tool apparatus, electromechanical means for micro-positioning a work contacting tool member relative to a workpiece.

Another object is to provide a novel tool assembly for accomplishing the aforementioned objects.

A further object is to provide a material removal control system compensated for high frequency vibration of the tool.

Brief description of the drawings

For a more thorough understanding of the invention, reference should be made to the following detailed specification and accompanying drawings in which similar elements are indicated by the same numerical designation and wherein.

Description of the preferred embodiments

Figure 1:
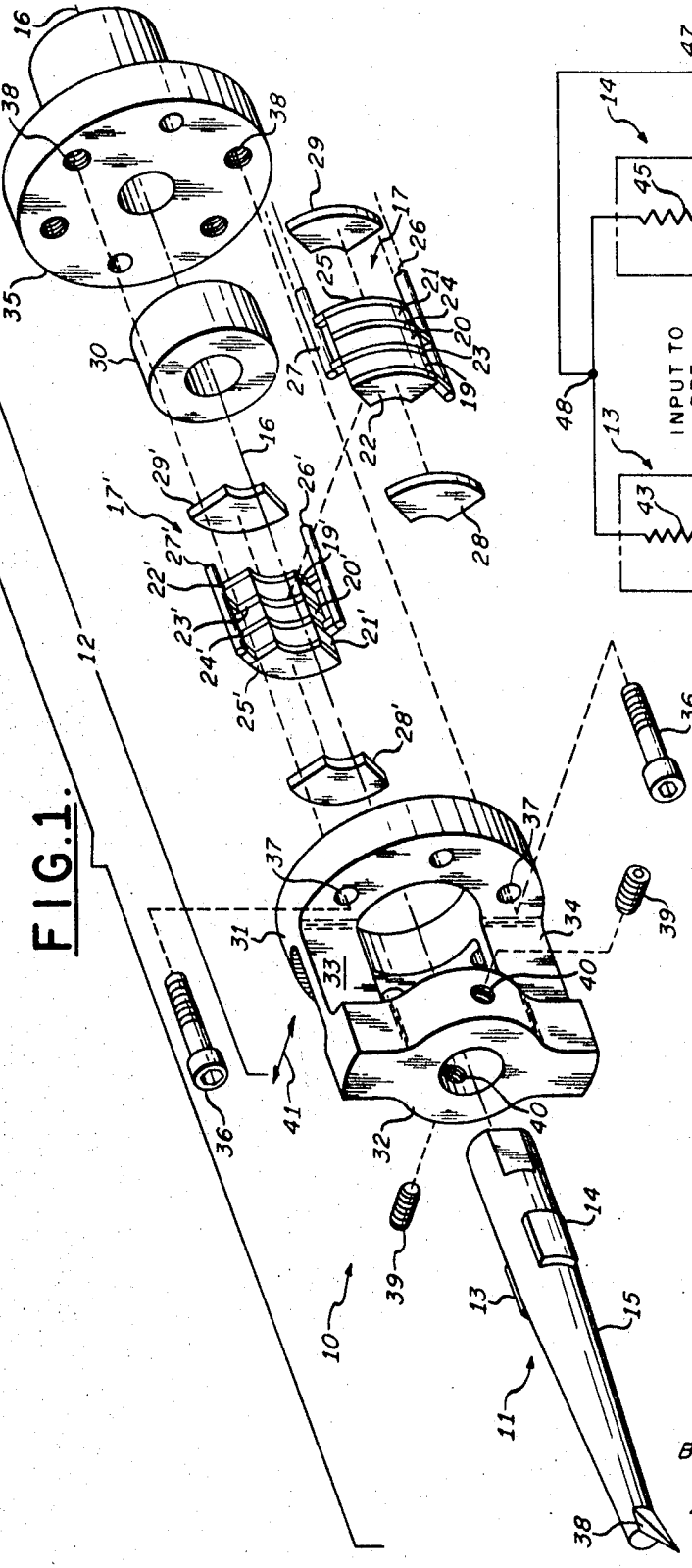
FIG. 1 is an exploded view of a novel tool assembly.

Referring to FIG. 1, a tool assembly 10 comprises a single point cutting tool 11, a piezoelectric actuator mechanism 12 and strain transducers 13 and 14 affixed to diametrically opposite sides of the tool shank 15. Piezoelectric stack 17 consists of alternate layers of flat polarized ceramic sections 19, 20 and 21 and flat copper segments 22, 23, 24 and 25 bonded together by silver mesh and cement. Alternate copper segment 22, 24 and 23, 25 are connected to copper rods 26 and 27 respectively. Unpolarized ceramic insulating sections 28 and 29 are cemented to each end of the stack. Piezoelectric stack 17′ is identical to stack 17 with rods 26′ and 27′ connected to copper segments 22′, 24′ and 23′, 25′ respectively. The ceramic sections and copper segments are approximately quarter sections of an annular band which has an outer diameter substantially equal to that of the spacer 30. Although only four ceramic sections are shown, in a practical tool assembly, each stack would contain approximately twenty or more such sections.

Line 16 designates the longitudinal axis of the tool assembly which may be constructed in the following manner. The piezoelectric stacks are inserted through the center hole in support ring 31 so that the front surface of insulating sections 28 and 28′ are placed in contact with the rear surface of tool holder 32 which is connected to the support ring by narrow flexible strips or ligaments 33 and 34. Spacer 30 is next inserted through the center hole of the support ring so that its front surface is placed in contact with the rear surface of insulating sections 29 and 29′, whereupon the rear surface of spacer 30 protrudes slightly beyond the rear surface of support ring 31. The front surface of mounting fixture 35 is then placed in contact with the rear surface of spacer 30 and fastened to support ring 31 by means of bolts 36 passed through colinearly aligned holes 37 and 38 in the support ring and mounting fixture respectively. The bolts are then tightened to increase the pressure of the front surface of spacer 30 against the rear surface of insulating sections 29 and 29' until a predetermined longitudinal compressive load is imposed on the piezoelectric stacks. The tool 11 is attached to the actuator mechanism by inserting the end of the shank remote from the work contacting member 38 into the longitudinally extending hole in tool holder 32. Screws 39 feed through holes 40 and tighten against the perimeter of the tool shank to clamp it in the tool holder.

In operation, the mounting fixture 35 is rigidly attached to some structure such as the base or transport mechanism of a machine tool (not shown). As a result, if the longitudinal compressive loading is increased on one piezoelectric stack and decreased on the other, ligaments 33 and 34 bend and cause the work contacting member 38 to move in the direction indicated by arrow 41. It should be noted that the work contacting member is aligned relative to the diametrically opposite stacks so that cutting resistant forces of the workpiece are oriented parallel to arrow 41. Likewise, the strain transducers are positioned so as to provide an output indicative only of forces applied in the direction of arrow 41. The operation of the strain transducers and actuator mechanism in a material removal control system will be more fully explained hereinafter with respect to FIG. 3.

Figure 2:
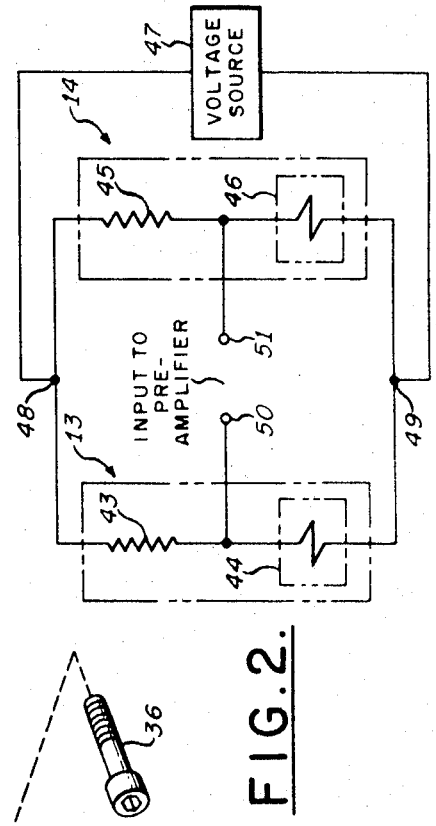
FIG. 2 is a schematic diagram of the strain transducer used in the tool assembly of FIG. 1.

Referring to FIG. 2, strain transducer 13, comprising resistor 43 and strain gauge 44, and strain transducer 14, comprising resistor 45 and strain gauge 46, are connected to form a bridge circuit energized by voltage source 47 applied to bridge terminals 48 and 49. The bridge output signal indicative of tool shank bending appears at terminals 50 and 51. A single strain transducer would be sufficient to measure shank bending but the bridge configuration is preferred because it is insensitive to longitudinal and torsional shank stresses. In addition, it can be made temperature insensitive by means of conventional temperature compensation techniques, one method being the use of strain gauges and precision resistors having matched thermal coefficients.

Figure 3:
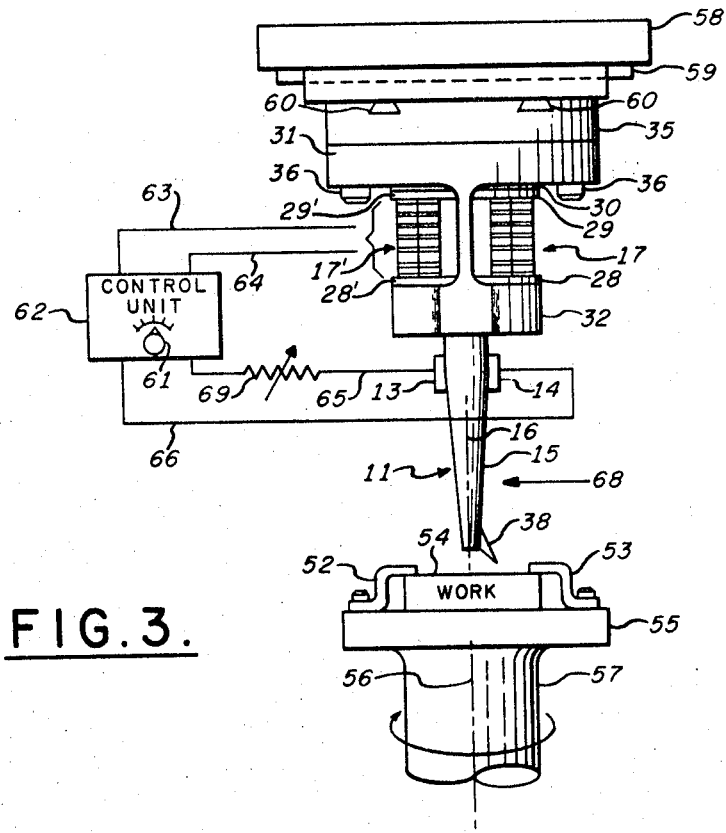
FIG. 3 is a block diagram of a machine tool system embodying the principles of the material removal control invention.

FIG. 3 depicts a material removal control system in which clamps 52 and 53 fasten the work 54 to support member 55. Although relative rotary and translatory motion between the work and tool may be provided by moving either or both of them, in the following description of the material removal control invention it will be assumed that a stationary tool is performing a boring operation wherein the work is rotated about axis 56 of spindle 57 connected to support member 55. Before the machining process is commenced the transport mechanism 58 is translated horizontally parallel to the plane of the drawing along machine ways 59 and perpendicular thereto along machine ways 60 to position the cutting tool 38 above the work. Final precision adjustment of the tool with respect to the work is performed by adjusting the bias control 61 of control unit 62 to transmit a bias signal through leads 63 and 64 to the piezoelectric stacks 17 and 17'. The bias signal causes a longitudinal compression of one stacks and expansion of the other by a suitable amount so that the work contacting member 38 is skewed in the plane of the drawing relative to the support ring 31 of the actuator mechanism, whereupon the work is ready to be fed to the tool by moving the spindle assembly vertically in a direction parallel to its longitudinal axis by means of a spindle feed mechanism (not shown). Although a vertical spindle and feed assembly has been described, a horizontal spindle supported on an air bearing may be preferred to achieve greater accuracy of motion along the spindle feed, particularly when the work is heavy or dynamically unbalanced, since this arrangement is inherently stiffer due to gravity loading.

During the machining operation, various factors disturb the position of the cutting tool relative to the work. For instance, if the work is unusually hard, considerable force is exerted against the tool in a direction transverse to its longitudinal axis 16 thereby substantially reducing the depth of cut. On the other hand, if the work is uniform except for a hard vein that comes into contact with the cutting tool once during each revolution of the work, the tool experiences a periodic pulse force transverse to its longitudinal axis with the result that the hole becomes unsymmetrical. The positional stability of the tool is also affected by chatter or rapid dither caused by, for example, a dull tool, inappropriate feed rate, improper depth of cut or perhaps foundation vibrations transmitted through the machine tool base and support structure. The material removal control invention compensates for these and other tool disturbances by providing means which have the effect of stiffening the tool shank in proportion of the forces impressed upon it so that it remains at a fixed lateral position during a machining cycle. In operation, flexing of the tool shank is measured by the strain transducers 13 and 14 which provide an error signal indicative of shank flexing. This error signal is connected by leads 65 and 66 to the input terminals of the control unit comprising a preamplifier input stage, a buffer stage and an emitter follower differential power amplifier output stage which supplies the low impedance actuator mechanism with a driver signal on leads 63 and 64. The driver signal produces longitudinal expansion of one piezoelectric stack and longitudinal compression of the other stack causing ligaments 33 and 34 (not shown in FIG. 3) to bend and thus deflect the tool shank. Consequently, if some force bends the tool shank by driving the cutting tool in the direction of arrow 68, piezoelectric stacks 17 and 17' contract and expand respectively to exert an equal and opposite force on the tool to hold the work contacting member at a fixed lateral displacement from a reference line collinear with the longitudinal axis of the shank in an unflexed state.

In general the relationship between the lateral movement of the tool and the voltage applied to the actuator mechanism is independent of depth of cut and the hardness of various materials but if gain adjustment is required, it may be provided by conventional means such as the variable resistor 69 connected in series with the output signal from the strain transducers.

Figure 4:
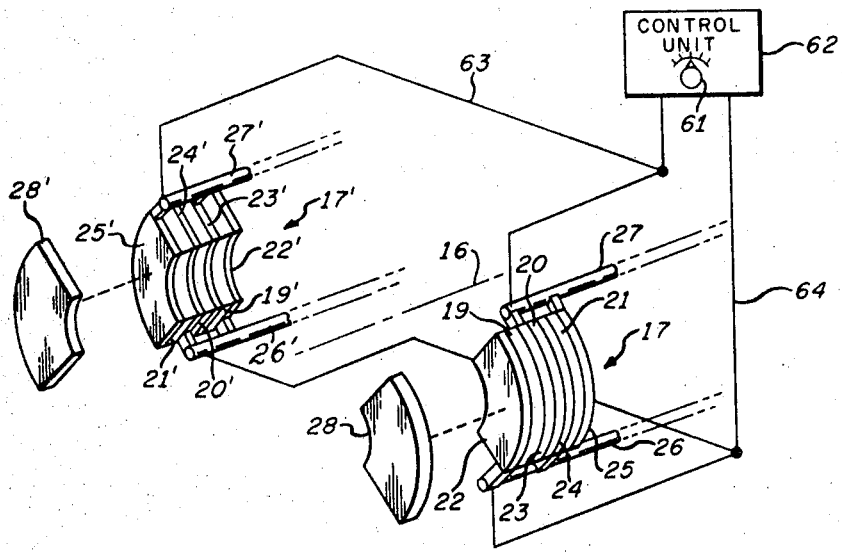
FIG. 4 is a schematic illustration of the piezoelectric stacks which are useful for explaining the operation of the system depicted in FIG. 3.

Referring to FIG. 4, lead 63 is tied to rod 27 of stack 17 and to rod 27' of stack 17' while lead 64 is tied to rod 26 of stack 1 and to rod 26' of stack 17', to form low impedance parallel electrical combinations of the individual ceramic sections 19, 20, 21 and 19' and 20', 21' in each piezoelectric stack. This arrangement, wherein the ceramic sections are cut and aligned to operate in a longitudinal compression mode, may be energized by a low voltage to produce large driving forces through small displacements on the order of microinches, a lead zirconate-titanate ceramic compound being highly suitable for electrical input/displacement output applications. Thermal, magnetostrictive or other type transducers may also be used in the actuator mechanism but the piezoelectric elements are preferred because of their accurate micro-motion, excellent linearity, low-energy consumption and comparatively broad bandwidth. The latter characteristic is particularly significant because it enables the actuator mechanism to compensate the tool position for high frequency dither. If the natural resonant frequency of the tool structure is within the bandwidth of the actuator mechanism, however, it is possible for an unstable condition to develop. For instance, suppose the resonant frequency of the tool is 4 kilocycles and the actuator bandwidth extends from D.C. to 5 kilocycles. If the tool is flexed in the direction of arrow 68 (FIG. 3) at a 4 kilocycle rate, the error signal from the strain transducer will skew the work contacting member in the opposite direction thereby causing the tool to flex even further in the direction of arrow 68. This unstable condition can be eliminated by incorporating in the control unit a lowpass filter network having an upper cut-off frequency equal to approximately one-quarter to one-half of the tool structure resonant frequency.

The piezoelectric stacks may also be constructed and operated so as to provide identical rather than differential longitudinal motions. Operation in this manner is useful in a grinding tool apparatus where the strain transducers and actuator mechanism are connected to a steady rest tool member placed in contact with a workpiece to counteract the force exerted against the work by the grinding wheel. To grind a crankshaft, for instance, a shaft may be supported at its ends and the grinding wheel rotated about an axis parallel to the longitudinal axis of the shaft. Bending of the shaft produced by contact with the grinding wheel is sensed and compensated for by the steady rest positioned against the shaft diametrically opposite the grinding wheel contact point. Fine positioning and material removal control are accomplished the same as for a differential actuator mechanism.

It should be apparent from the foregoing description that both differentially and identically operating actuator mechanisms may be included in a single tool assembly to provide both lateral and longitudinal fine position and material removal control. Moreover, the various tool assembly configurations may be employed as measuring instruments in which a probe replaces the cutting tool. For measurement applications, however, the output terminals of the strain transducers are disconnected from the control unit and various hole characteristics determined by monitoring the output of the transducer. As an example, after moving the probe into a predetermined contact pressure with the side of the hole, roundness could be measured simply by rotating the workpiece and taper measured merely by translating the work parallel to the longitudinal axis of the hole.

As an alternative to setting the initial position of the probe with respect to a hole by some manual method such as translating the work or tool member or adjusting the bias control to skew the tool member, automatic positioning can be obtained by connecting an integrator between the control unit and actuator mechanism and also coupling the integrator output back to the input terminals of the control unit prior to the commencement of the measuring cycle. With this setup, a predetermined bias signal is switched into the input of the control unit to skew the tool so that the probe moves gently to contact the side of the hole at a prescribed pressure.

If the machining process is performed with a stationary workpiece and a rotating tool, the output of the strain transducers must be coupled to the control unit 62 through slip rings. In this case the preamplifier stage of the control unit is preferably mounted on the rotating tool so that the strain transducer output signal may be amplified before it passes through the slip rings in order to enhance the system signal to noise ratio. In this case, it may also be considered desirable or necessary to employ two strain transducers placed in spaced quadrature about the periphery of the tool or perhaps two sets of transducers so arranged in order to detect flexing in mutually perpendicular planes.

I claim:

1. In a machine tool apparatus, means for maintaining positional stability between a workpiece and a machine tool member, comprising sensing means having an output terminal for providing a signal thereat indicative of relative motion between a machine tool member and a workpiece, an actuator mechanism responsible to the signal to compensate for said relative motion, said actuator mechanism including a pair of parallel spatially separated support members, a pliable ligament connecting the support members and an electrical input/displacement output device positioned between the support members, and means for coupling the output terminal of the sensing means to the signal responsive means.

2. The apparatus of claim 1 wherein the actuator mechanism includes another electrical input/displacement output device, the pair of electrical input/displacement output devices being diametrically disposed about the longitudinal axis of the actuator mechanism.

3. The apparatus of claim 2 wherein the sensing means is a pair of strain transducers diametrically disposed about the periphery of the tool member and connected in an electrical bridge configuration so that the signal produced at the output terminals thereof is indicative of tool member flexing only.

4. The apparatus of claim 3 and further including means in said coupling means for providing a signal to the actuator mechanism to adjust the position of the tool member.

5. The apparatus of claim 4 wherein the coupling means includes a lowpass filter network having an upper cut-off frequency equal to approximately one-quarter to one-half of the natural resonant frequency of the tool member.

6. The apparatus of claim 2 wherein each of the electrical input/displacement output devices comprise piezoelectric stacks consisting of alternate layers of piezoelectric ceramic elements and electrical conductors, and insulating elements affixed to each end of the stacks, the insulating elements and piezoelectric stacks forming approximately a quarter section of an annular band and the ceramic elements of each stack being connected in electrical parallel.

7. The apparatus of claim 6 wherein the piezoelectric stacks are held in compression between the support members and the signal from the sensing means is operative to cause longitudinal expansion of one stack and further compression of the other stack thereby flexing the pliable ligaments and skewing the tool member in a manner to compensate for bending thereof.

References Cited

UNITED STATES PATENTS

| | | | |
|---|---|---|---|
| 1,768,377 | 6/1930 | Serduke | 77—58 |
| 2,600,453 | 6/1952 | Weingart | 77—1 |
| 3,217,568 | 11/1965 | De Graffenried | 77—3 |
| 3,237,486 | 3/1966 | Gilbert et al. | 77—1 |
| 3,244,029 | 4/1966 | Jacobson | 77—3 |
| 3,279,285 | 10/1966 | Ivins | 77—1 |

GERALD A. DOST, Primary Examiner

U.S. Cl. X.R.

77—58